United States Patent
Küster et al.

(10) Patent No.: US 6,616,229 B2
(45) Date of Patent: Sep. 9, 2003

(54) CAR SEAT

(75) Inventors: Peer Küster, Hannover (DE); Mirco Polak, Stadthagen (DE); Karl Georg Suhle, Minden (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/729,945

(22) Filed: Dec. 6, 2000

(65) Prior Publication Data

US 2001/0022458 A1 Sep. 20, 2001

(30) Foreign Application Priority Data

Dec. 6, 1999 (DE) .......................... 199 58 677

(51) Int. Cl.[7] .............................. B60N 2/44
(52) U.S. Cl. ............... 297/284.9; 297/284.2; 297/284.3
(58) Field of Search .......... 297/284.2, 284.9, 297/284.3

(56) References Cited

U.S. PATENT DOCUMENTS

| | | | | |
|---|---|---|---|---|
| 3,273,877 A | * | 9/1966 | Geller et al. ................. 267/89 |
| 3,399,883 A | * | 9/1968 | McKey ........................ 267/89 |
| 4,500,136 A | * | 2/1985 | Murphy et al. ........... 297/284.9 |
| 4,607,887 A | * | 8/1986 | Vail ....................... 297/452.26 |
| 4,629,248 A | * | 12/1986 | Mawbey ................. 297/284.11 |
| 4,636,000 A | * | 1/1987 | Nishino .................... 297/284.9 |
| 4,671,569 A | * | 6/1987 | Kazaoka et al. .......... 297/284.4 |
| 4,722,550 A | * | 2/1988 | Imaoka et al. .............. 280/727 |
| 4,767,155 A | * | 8/1988 | Kousaka et al. .......... 297/284.9 |
| 5,022,709 A | * | 6/1991 | Marchino .............. 297/452.24 |
| 5,328,236 A | * | 7/1994 | Mizushima et al. ...... 297/284.9 |
| 5,975,633 A | * | 11/1999 | Walk et al. ............... 297/284.9 |

FOREIGN PATENT DOCUMENTS

| | | |
|---|---|---|
| DE | 197 37 271 C1 | 8/1997 |
| DE | 297 23 586.9 | 8/1998 |
| DE | 199277886 A1 * | 3/2001 |

* cited by examiner

*Primary Examiner*—Peter M. Cuomo
*Assistant Examiner*—Joseph Edell
(74) *Attorney, Agent, or Firm*—Connolly Bove Lodge & Hutz LLP

(57) ABSTRACT

A car seat having a seat part and a central spring system for the seat part. The central spring system can be adjusted to vary the hardness of the seat part. Additionally, the car seat is provided with side reinforcements on the seat part that extend in the traveling direction, whose position or the position of their upper edge regions is adjustable in accordance with the hardness of the spring system of the seat. The adjustment of the spring system is such that a greater degree of hardness corresponds to a higher position of the upper edge regions of the side reinforcements.

10 Claims, 5 Drawing Sheets

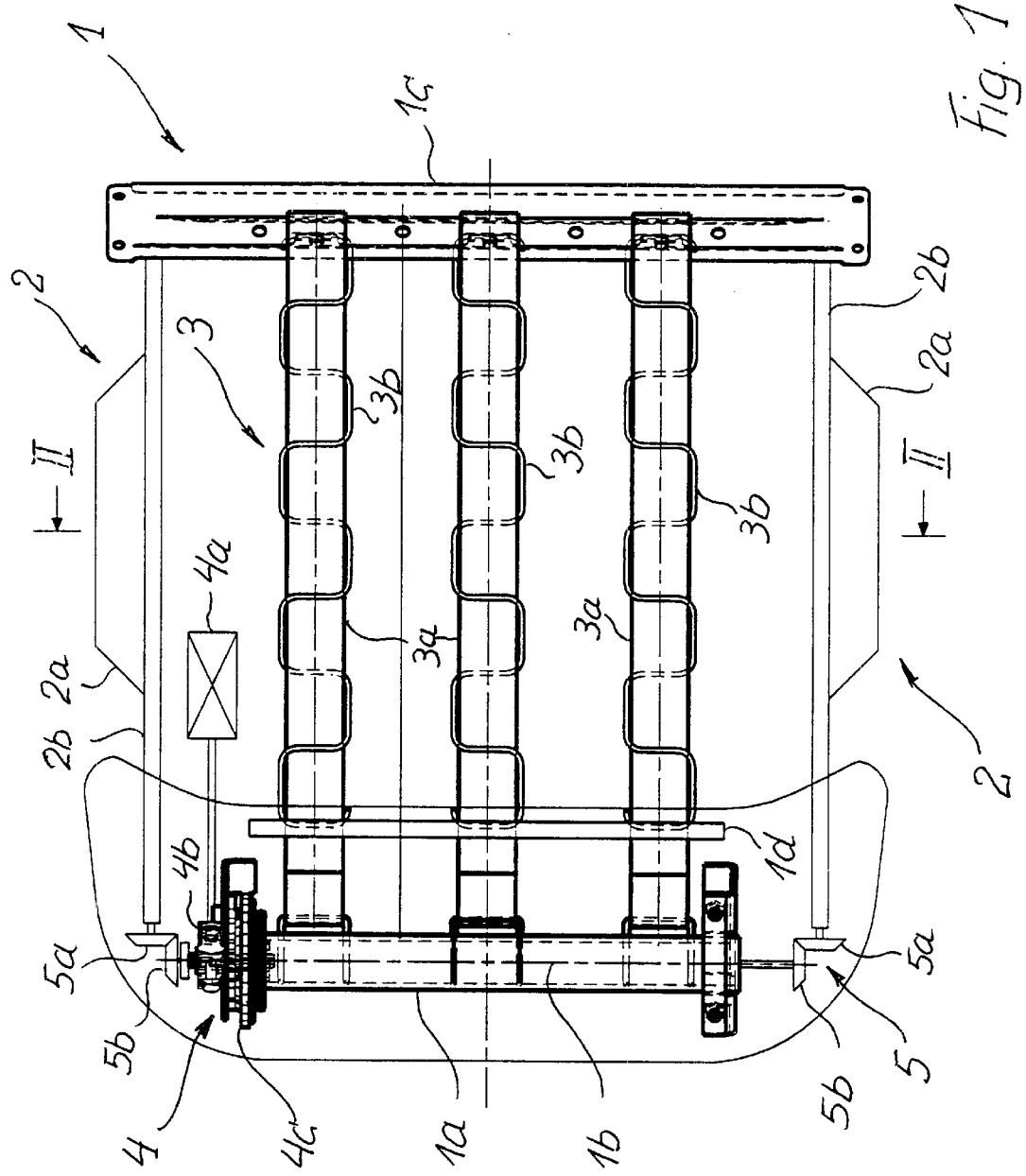

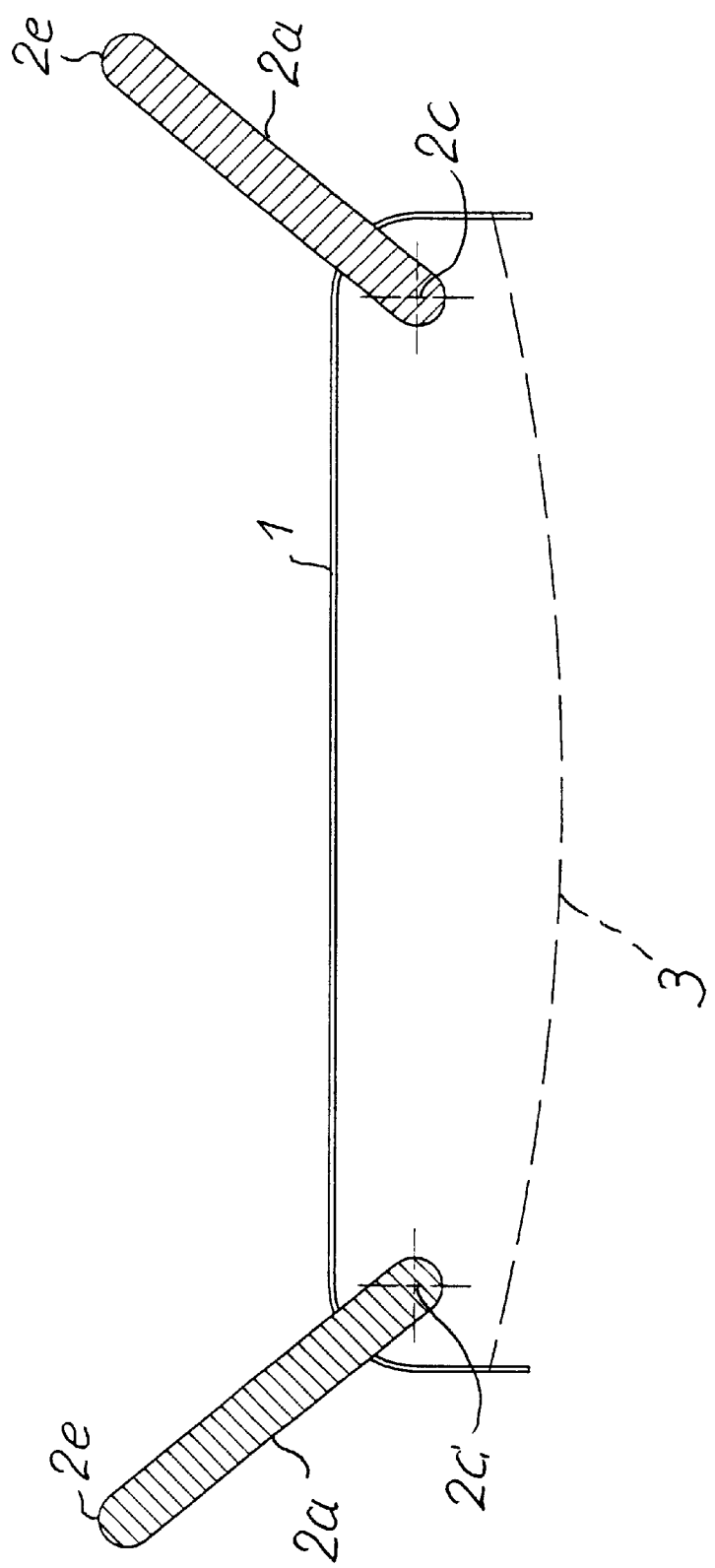

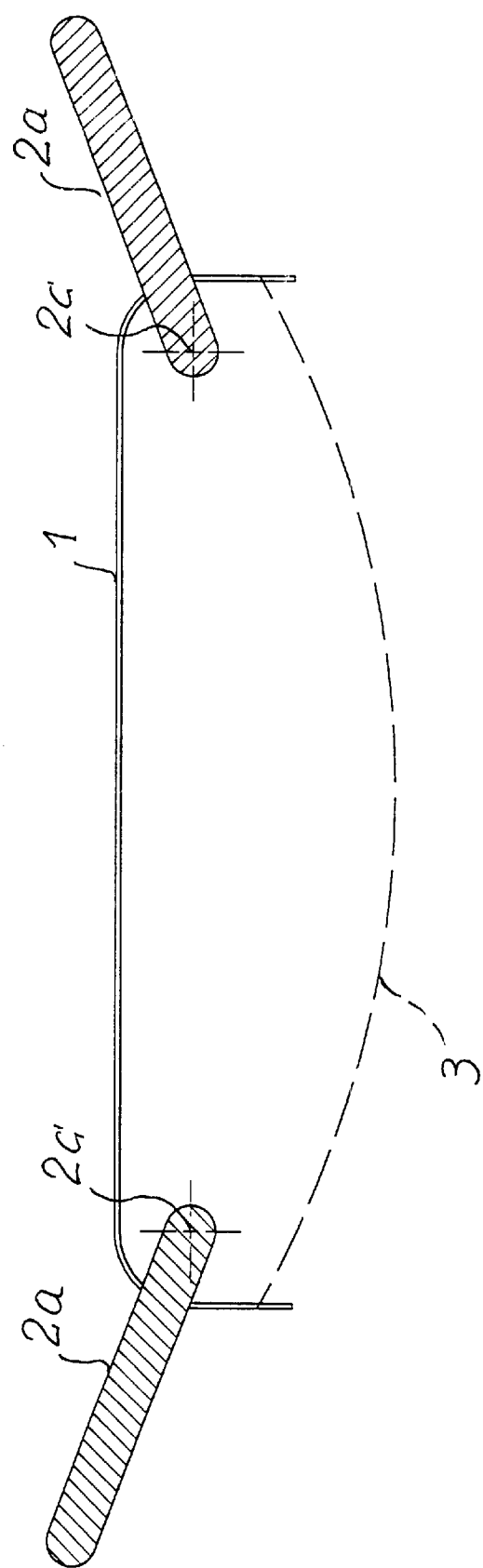

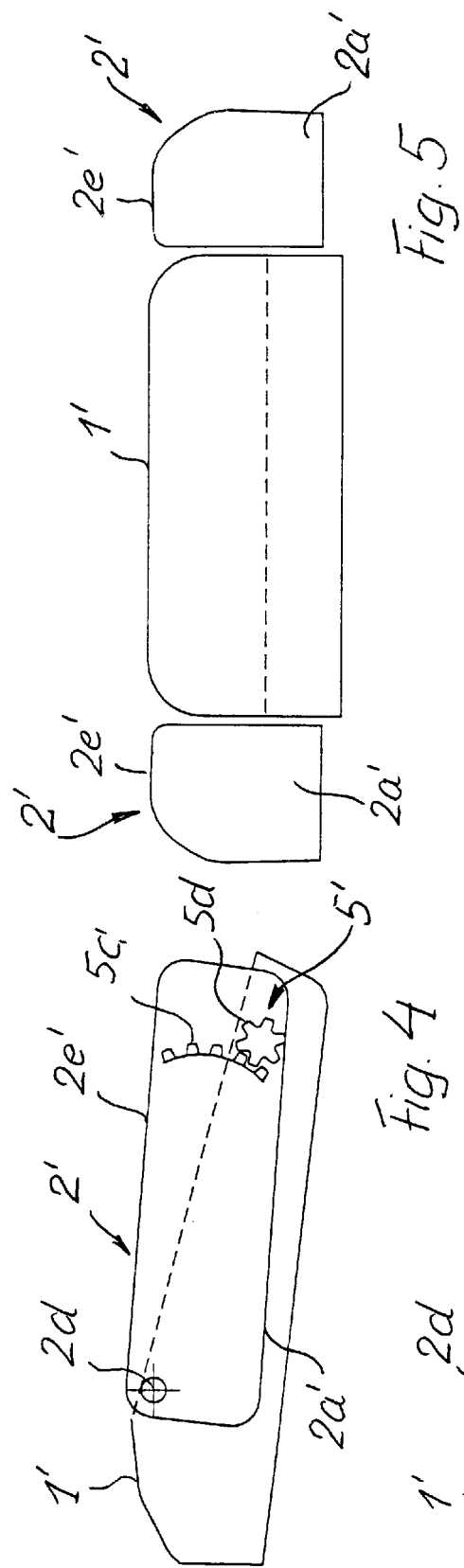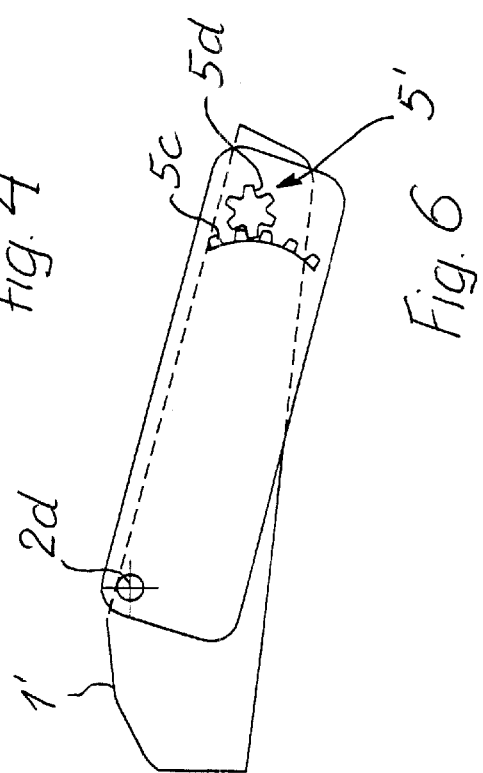

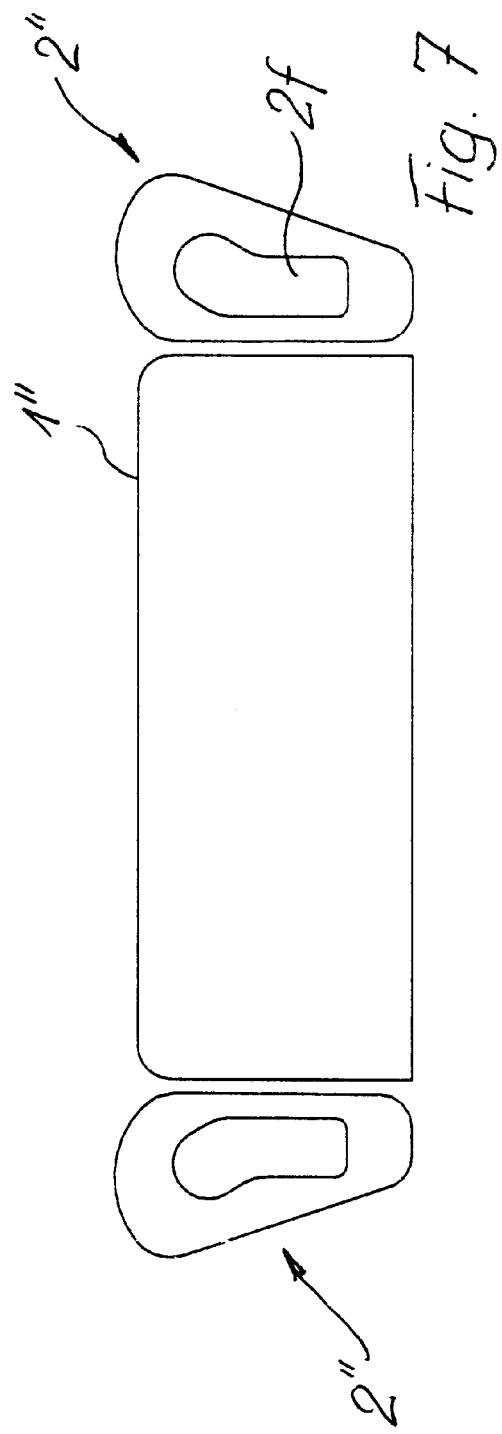
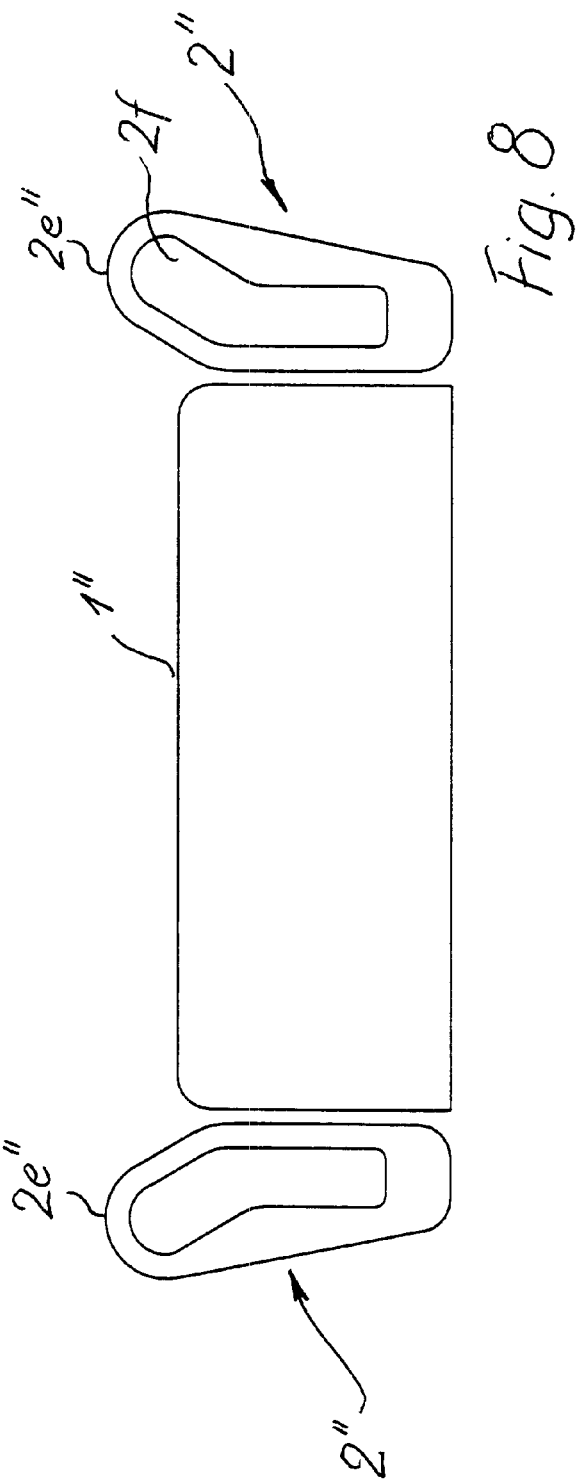

CAR SEAT

FIELD OF THE INVENTION

The invention relates to a car seat with a central spring system having an adjustable hardness. More specifically, the car seat has side reinforcements that are provided on the seat part and can be extended in the direction of travel.

BACKGROUND OF THE INVENTION

According to a car seat of the known type (DE 297 23 586 U1), the hardness of the seat can be adjusted by changing the spring length and the initial tension in the spring is, thus, also adjustable.

Also known (from DE 197 37 271 C1) is a car seat wherein the side reinforcements can be rotated along the rotation axis in the direction opposite to the direction of the travel. This makes it possible to adjust the width of the seat and the side support for the seat part according to requirements.

A sport driver who prefers a firm and hard seat will require also a good side support, which is achieved with a particular definition of the side reinforcements. A comfort-oriented driver, on the other hand, will prefer a soft, comfortable seat with fewer distinctly defined side reinforcements. The separated adjustment of the seat hardness and of the design of the side reinforcement is complicated. With a separate and independent adjustment capability, both functions can also easily result in erroneous adjustments.

SUMMARY OF THE INVENTION

Based on this status of technology, the purpose of this invention is to form a car seat according to prior art in such a way that it enables to match in a simple manner the complete adjustment of the seat part with the individual requirements of different drivers.

The solution of this task is provided in accordance with the characteristics disclosed in patent claim 1.

In accordance with the car seat of this invention, the hardness of the seat can be changed and combined with the formation of the side reinforcements easily and quickly.

Preferred embodiments of the invention will be further described based on the subordinated claims.

BRIEF DESCRIPTION OF THE DRAWINGS

The following is a preferred embodiment form of the invention based on the enclosed figures which are described in detail. The figures indicate:

FIG. 1—a top view of the frame of a seat part according to a first embodiment form;

FIG. 2—a greatly simplified representation of the section along plane II—shown in FIG. 1 with a sporty hard seat adjustment.

FIG. 3—a section corresponding to FIG. 2 indicating a more comfortable seat adjustment;

FIG. 4—a schematic side view of a seat part support according to a second embodiment form provided with side reinforcements located in a high position;

FIG. 5—a schematic front view of the seat part support according to FIG. 4;

FIG. 6—a schematic side view of the seat part support according to FIG. 4 with lowered side reinforcements;

FIG. 7—a schematic front view of a seat part support according to a third embodiment form with lowered side reinforcements, which have an adjustable form;

FIG. 8—a schematic front view of the seat part support according to FIG. 7 with raised side reinforcements.

DETAILED DESCRIPTION OF THE INVENTION

Only the support 1, 1', or 1" of the seat part is indicated in all the figures. This support 1 is provided with a seat part frame of which only one rear transverse spar 1c and front spar 1d are shown in FIG. 1. Inside the seat part frame is arranged a spring system 3. Rotatable side reinforcements 2 are connected to the seat part frame.

Between the transverse spars 1c and 1d are extended shaped wire springs 3b. On the rear transverse spar 1c, are further also attached belt-shaped longitudinal spring elements 3a, which are extended over the front transverse spar 1d all the way up to transverse wave 1a. The longitudinal spring elements 3a run in the meandering form of the turns of the formed wires 3b. The longitudinal wire elements 3a are linked to transverse wave 1a. They form the variable tensile spring system 3 of the seat part.

The transverse wave 1a is supported in support 1 on bearings so that it is rotatable around vertical axle 1b. It is driven with a rotation adjustment mechanism 4c and with an attached gear 4b of an electric motor 4a. The transverse wave 1a is firmly connected on both of its sides with bevel gears 5b to provide torsional strength. The bevel gears 5b engage bevel gears 5a arranged on rotating shafts 2b. The bevel gears 5a and 5b form a gear unit 5 enabling to drive supporting structures 2a of the side reinforcement 2 attached to rotating shafts 2b.

Tension is created in the longitudinal spring elements 3a or released by the turning of transverse wave 1a. The tension in the spring system is indicated in FIG. 2 and FIG. 3 by the cross-sectional contour of the spring system 3. Simultaneously with the turning of transverse wave 1a, the supporting structure 2a of side reinforcement 2 is rotated by gear unit 5 around longitudinal axle 2c. At the same time, the upper edge regions 2e of the supporting structures 2a will travel, due to the effect of gear unit 5, in the upward and inward direction in the tension applying direction of the rotation of transverse wave 1a. Side reinforcements 2, which surround supporting structures 2a, thus provide excellent side support for a seat user when they are in their inwardly retracted position.

The second embodiment form shown in FIG. 4 through FIG. 6 differs from the previous embodiment only in the arrangement and adjustment of the side reinforcement 2'. The supporting structures 2a' are rotatable around vertical axles 2d mounted at right angles to the direction of the travel. Vertical axles 2d are provided in the vicinity of the leading edge of side reinforcement 2', on the side turned away from the back support.

A pinion gear 5d connected through gear unit 5' to transverse wave 1a is engaged by tooth segment 5c which is arranged on the supporting structure 2a'. The pinion gear 5d runs on bearings in support 1' so that it is rotatable around an axle running parallel to vertical axle 2d.

With a harder adjustment of spring system 3, as shown in FIG. 4, the upper edge region 2e' is rotated around vertical axle 2d in the counterclockwise direction. A soft adjustment of the spring system 3 results in a lowering of the rear end of the supporting structure 2a' into the position which is indicated in FIG. 6.

In a third embodiment form shown in FIGS. 8 and 9, side reinforcements 2" are arranged on the longitudinal sides of support 1" so that a chamber 2f is enclosed in each of them.

The supporting structure of the side reinforcements 2" is constructed in such a way that an increased pressure in chamber 2f will cause stretching of the side support 2" in the vertical direction and in the direction outward. Because of that, the upper edge region 2e" of the side support 2" will be displaced so that it will be tilted in the outward/upward direction. The pressure applied in chambers 2f is controlled according to a known manner, not indicated here, by valves depending on the turning position of the transverse wave 1a. The stretched form of the side support 2" thus corresponds to the harder adjustment of the spring system 3.

What is claimed is:

1. A car seat comprising:

a central spring system (3) with longitudinal spring elements having an adjustable resistance force, wherein the resistance force is adjusted by a rotating driving gear that rotates a transverse wave, the transverse wave linked to one end of the spring elements and an opposite end of the spring elements fixed on a rear transverse spar; and side reinforcements extending in the direction of travel each with an upper edge region, wherein the position of the side reinforcements or of the upper edge regions changes depending on the resistance force of the central spring system (3) so that an increase in the resistance force of the central spring system (3) corresponds to a higher position of the upper edge regions, wherein the position of the side reinforcements is changed by coupling the rotation of the transverse wave with a gear unit.

2. The car seat according to claim 1, wherein the upper edge region (2e) is supported on a supporting structure (2a) linked to a support (1) of the seat so that the upper edge region (2e) can rotate inward and outward around a longitudinal axis (2c) relative to the direction of the travel.

3. The car seat according to claim 2, wherein the supporting structure (2a) rotates around a longitudinal axis (2c), and is attached to a rotating shaft (2b), the rotating shaft disposed parallel to the longitudinal axis (2c) and is engaged by the bevel gear unit, wherein the bevel gear unit is in union with a bevel gear (5b) of the driving gear.

4. The car seat according to claim 2, wherein the supporting structure (2a') of the upper edge region (2e') is operated by a tooth segment (5c) and a related pinion gear (5d) whose rotational axis is parallel to a transverse axis (2d) disposed at a right angle to the direction of travel.

5. The car seat according to claim 1, wherein the upper edge region (2e') is supported on a supporting structure (2a) linked to a support (1') of the seat so that the upper edge region (2e') can rotate upward and downward around a transverse axis (2d) disposed at a right angle to the direction of travel.

6. The car seat according to claim 5, wherein the transverse axis (2d) passes through a front region of each side reinforcement (2').

7. The car seat according to claim 1, wherein the gear unit (5) is a bevel gear.

8. The car seat according to claim 1, wherein the driving gear (4) is operated by an electric motor (4a) that operates an attached gear (4b) of a rotation adjustment mechanism (4c).

9. A car seat comprising: one or more spring support elements connected to a rotating member, wherein rotation of the rotating member adjusts the resistance force of the spring support elements; and side support members with an upper edge region extending out from the seat, and the position of the side support members changes as the resistance force of the spring support elements is adjusted, the side support members move in toward the seat as resistance force in the spring support elements increases, wherein the side support members include a rotating shaft coupled to a bevel gear in union with the rotating member.

10. The car seat of claim 9, wherein the rotating member is a transverse wave, the transverse wave connected to one end of the spring support elements, and an opposite end of the spring support elements is fixed on a transverse spar.

* * * * *